US006820080B2

(12) United States Patent
Anderson et al.

(10) Patent No.: US 6,820,080 B2
(45) Date of Patent: Nov. 16, 2004

(54) DEPENDENT OBJECT PROCESSING FOR TRIGGERS

(75) Inventors: Mark John Anderson, Oronoco, MN (US); Kevin Robert Brettin, Rochester, MN (US); Russell Edward Bruhnke, Rochester, MN (US); Kyle Eric Gilbertson, Rochester, MN (US); Ritchie Lee Nyland, Rochester, MN (US); Richard Donald Parrott, Rochester, MN (US); Kathy Lynn Passe, Oronoco, MN (US); Randy Keith Rolfe, Rochester, MN (US); Susan Liisa Romano, Rochester, MN (US); Renee Kristin Saxman, Rochester, MN (US); Kathryn Rose Steinbrink, Chatfield, MN (US); Mark William Theuer, Rochester, MN (US); Jonathan Lee Triebenbach, Rochester, MN (US); Michael Alan Venz, Rochester, MN (US); Jane Ann Vold, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 09/817,602

(22) Filed: Mar. 26, 2001

(65) Prior Publication Data

US 2002/0184207 A1 Dec. 5, 2002

(51) Int. Cl.[7] .............................................. G06F 17/30
(52) U.S. Cl. .................... 707/4; 707/2; 707/3; 707/101; 707/102; 707/103; 707/104
(58) Field of Search ................................ 707/2, 3, 100, 707/101, 102, 103, 104, 4; 235/462

(56) References Cited

U.S. PATENT DOCUMENTS

| 5,133,068 A | | 7/1992 | Crus et al. ................... 707/100 |
| 5,496,992 A | * | 3/1996 | Madan et al. ................ 235/462 |
| 5,680,614 A | * | 10/1997 | Bakuya et al. ............... 707/103 |
| 5,706,494 A | | 1/1998 | Cochrane et al. .............. 707/2 |
| 5,873,075 A | * | 2/1999 | Cochrane et al. .............. 707/2 |
| 5,926,819 A | * | 7/1999 | Doo et al. ................... 707/104 |

FOREIGN PATENT DOCUMENTS

| EP | 0 811 944 A2 | * | 12/1997 |
| WO | WO 00/72563 A1 | * | 11/2000 |

OTHER PUBLICATIONS

Abugov, "From Trendcharts to control Charts: Setup Tests for Making the Leap", IEEE, 1992, pp. 3–7.*

* cited by examiner

Primary Examiner—Thuy N. Pardo
(74) Attorney, Agent, or Firm—Moser, Patterson & Sheridan, LLP

(57) ABSTRACT

Methods, systems and articles of manufacture are provided for setting a state of triggers between operative and inoperative. In an operative state the trigger may be called during triggering I/O operations such as Insert, Update and Delete. The inoperative state indicates that the system has detected a condition requiring user intervention. In a particular embodiment, a database management system (DBMS) will analyze the function being performed on a table (such as a rename of the table) and with dependent object data, the DBMS will determine if the trigger is self-referencing. If so, the trigger made inoperative. Making the trigger inoperative and requiring user intervention prevents the system from potentially producing undesired results.

In another embodiment, a determination of dependency is made upon receiving a database command to affect an object. According to the type of command, the object and its dependents are either affected or unaffected.

31 Claims, 11 Drawing Sheets

TDE

| GENERAL TRIGGER DEFINITION INFORMATION HEADER<br>STATUS - INOPERATIVE<br>SELF - REFERENCING ATTRIBUTE | — 700 |

TRIGGER NAME - - - LIB1/TRIG1

DEPENDENT OBJECT AREA INFORMATION

DATA FOR TABLE 1 : OBJOFF  OBJLEN  LIBOFF  LIBLEN

DATA FOR TABLE 2 : OBJOFF  OBJLEN  LIBOFF  LIBLEN

DATA FOR TABLE 3 : OBJOFF  OBJLEN  LIBOFF  LIBLEN

SANITIZED CREATE TRIGGER STATEMENT AREA
CREATE TRIGGER LIB1 . TRIG1 AFTER UPDATE OF COL1 , COL2 ,
COL3 ON LIB1. TABLE1X REFERENCING OLD AS X1 NEW AS X2
FOR EACH ROW MODE DB2SQL WHEN ( X1 . COL1 = 1 ) BEGIN
ATOMIC INSERT INTO LIB1 . TABLE1 ( COL1 , COL2 , COL3 )
VALUES ( 1 , 2 , 3 ) ; INSERT INTO LIB1 . TABLE2 ( COL1 ,
COL2 , COL3 ) VALUES ( 4 , 5 , 6 ) ; INSERT INTO LIB2 .
TABLE3 ( COL1 , COL2 , COL3 ) VALUES ( 7 , 8 , 9 ) ; END

DEPENDENT OBJECT PROCESSING FOR TRIGGERS

BACKGROUND OF THE INVENTION

1. Field of the Invention

Embodiments of the present invention relate to information processing and more specifically to management of database triggers where dependencies exist.

2. Background of the Related Art

Databases are computerized information storage and retrieval systems. A relational database management system (RDBMS) is a computer database management system that uses relational techniques for storing and retrieving data. Relational databases are computerized information storage and retrieval systems in which data in the form of tables (formally denominated "relations") are typically stored for use on disk drives or similar mass data stores. A "table" includes a set of rows (formally denominated "tuples" or "records") spanning several columns. Reference is made to C. J. Date, *An Introduction to Database Systems*, 6th edition, Addison-Wesley Publishing Co. Reading, Mass. (1994) for an comprehensive general treatment of the relational database art.

An RDBMS is structured to accept commands to store, retrieve and delete data using high-level query languages such as the Structured Query Language (SQL). The term "query" denominates a set of commands for retrieving data from a stored database. The SQL standard has been promulgated by the International Standards Association since 1986.

A major goal of the underlying query compiler is to provide a suite of mechanisms so that user data can be easily stored and efficiently manipulated. In particular, an SQL query can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across one or more tables.

Regardless of the type and creator, tables are manipulated uniformly by means of the Data Manipulation Language (DML), such as those defined in the SQL standards. In some cases, a table is manipulated by the use of triggers. Triggers are procedures that are defined by users of the RDBMS. The RDBMS invokes triggers when particular events (associated with the triggers) occur. Specifically, an SQL trigger program is written to take some action due to an insert, update, or delete operation against an SQL table in a database. For example, in the case of an insert operation, a trigger can be defined such that it is invoked each time a row is inserted into a particular SQL table. A trigger can instruct the system to take any number of actions when a specified change is attempted. Accordingly, triggers help maintain the integrity of the database.

One problem/limitation with current trigger implementations is that a user may make changes to a table unaware of a potential impact on the trigger. Specifically, the impact results because, following the change, objects may be missing or different. For example, consider the case in which a table T1, upon which a self-referencing trigger is defined, is renamed to T2. Within the trigger's routine body, T1 is not renamed to T2. The intent of the rename, with respect to the trigger, is unknown. Accordingly, it is not known whether T1 should have been renamed to T2 in the trigger body. This situation is further complicated when T1 is later restored or another table T1 is created on the system because the table the user intended for the trigger to use is unknown. As a result of the user's actions, the wrong table or library may be used, whereby the trigger produces incorrect results.

A conventional RDBMS is not equipped to handle the foregoing situations. To anticipate problems associated with triggers having dependent objects, a user is required to manually query a dependent trigger table in an SQL catalog to determine whether a given operation on a table will impact any triggers dependent on the table. This approach is both time-consuming and replete with the potential for human error.

Therefore, there is a need for a method and system to overcome the shortcomings of the prior and, in particular, maintaining integrity in databases in the event of trigger modifications.

SUMMARY OF THE INVENTION

Methods, systems and articles of manufactures are provided for setting a state of triggers between operative and inoperative. Further, methods, systems and articles of manufactures are provided for determining a dependency between objects made upon receiving a database command to affect an object. According to the type of command, the object and its depends are either affected or unaffected.

In one embodiment, a data structure, comprising trigger definition information for a trigger defined on a table is provided. The trigger definition information comprises a status value indicative of whether the trigger definition is operative or inoperative and a type value indicative of whether the trigger definition is self-referencing. The trigger definition information may also comprise at least one dependent object having a dependency relationship with the trigger definition.

Another embodiment provides a method of maintaining integrity in a database comprising a plurality of triggers defined on at least one of a plurality of tables. The method comprises receiving an I/O event affecting an object, determining whether a trigger defined on the object is self-referencing and, if the trigger is self-referencing, making the trigger inoperative.

Another method of maintaining integrity in a database comprising a plurality of triggers defined on at least one of a plurality of tables comprises receiving an I/O event affecting an object and determining whether the object has a dependency relationship with at least one trigger of the plurality of triggers. If the object has a dependency relationship with at least one trigger, the method further comprises determining a table on which the at least one trigger is defined, wherein the table has trigger definition space. A trigger definition entry of the at least one trigger is then located within the trigger definition space and the at least one trigger is made inoperative.

In still another embodiment, a signal bearing medium containing a program which, when executed by at least one processor, performs a method of maintaining integrity in a database comprising a plurality of triggers defined on at least one of a plurality of tables. The method comprises receiving an I/O event affecting an object, determining whether a trigger defined on the object is self-referencing and, if the trigger is self-referencing, making the trigger inoperative.

In still another embodiment, a signal bearing medium containing a program which, when executed by at least one processor, performs a method of maintaining integrity in a database comprising a plurality of triggers defined on at least one of a plurality of tables. The method comprises receiving an I/O event affecting an object and determining whether the object has a dependency relationship with at least one trigger of the plurality of triggers. If the object has a dependency relationship with at least one trigger, the method further comprises determining a table on which the at least one trigger is defined, locating a trigger definition entry of the at least one trigger and making the at least one trigger inoperative.

In still another embodiment, a signal bearing medium containing a database management program which, when executed by at least one processor, performs a method of maintaining integrity in a database comprising a plurality of triggers defined on at least one of a plurality of tables. The method comprises, upon receiving a database command to affect a database object, determining whether at least one dependent entity is dependent on the database object. If the least one dependent entity is dependent on the database object and if the database command is a first command type, then the method comprises leaving the database object and the at least one dependent entity unaffected by the database command. In one embodiment, the method further comprises, if the least one dependent entity is dependent on the database object and if the database command is a second command type, affecting the database object according to the database command and dropping the at least one dependent entity. In another embodiment, the method further comprises, if the least one dependent entity is dependent on the database object and if the database command is a third command type, affecting the database object according to the database command and leaving the at least one dependent entity unaffected.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is an illustrative trigger definition entry.

DETAILED DESCRIPTION OF THE PREFERRED EMBODIMENT

Figure 1:
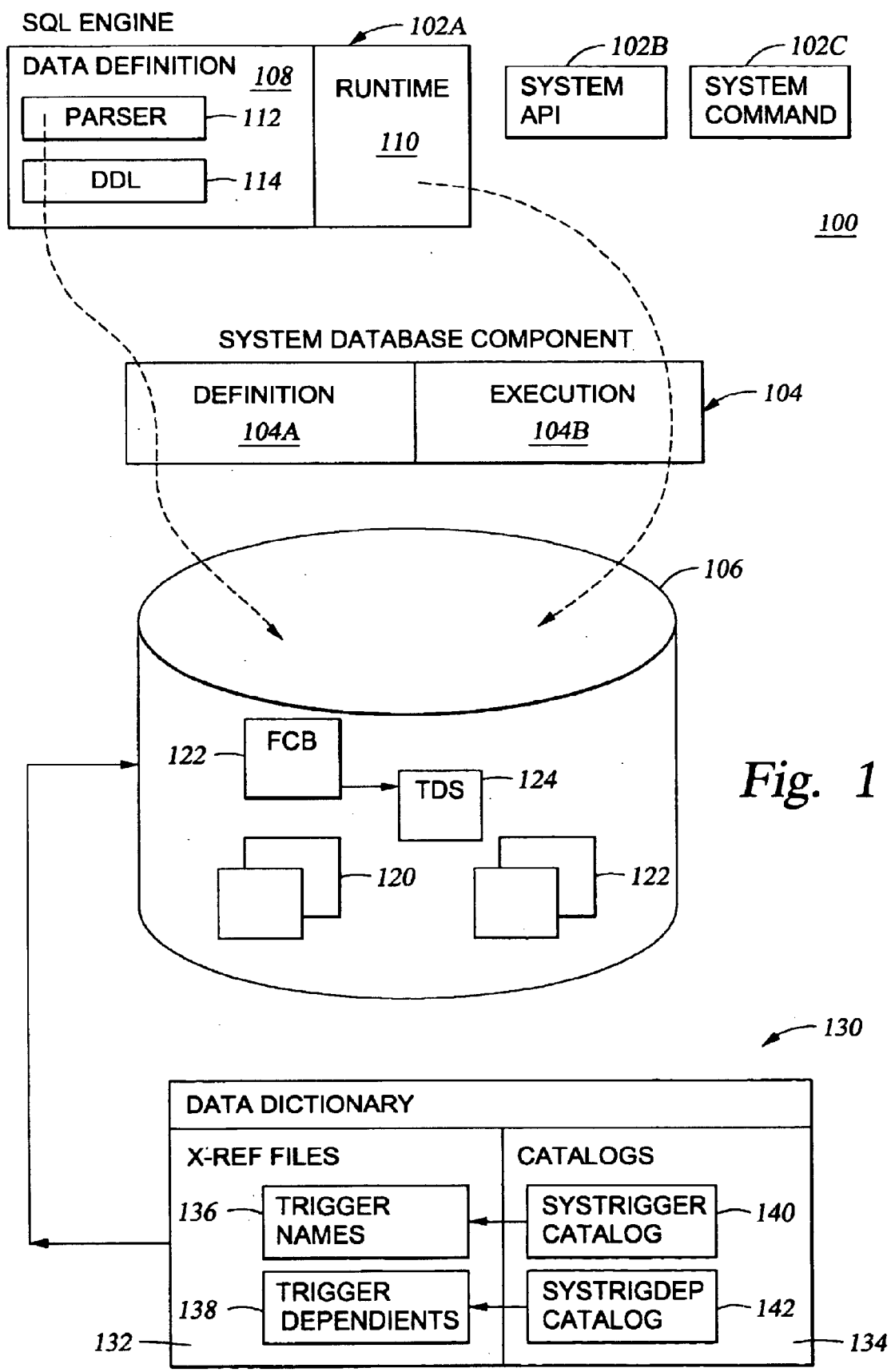
FIG. 1 is a high level diagram of a database system.

Methods, systems and articles of manufactures are provided for setting a state of triggers between operative and inoperative. Some embodiments are implemented as a program product for use with a computer system such as, for example, the system 100 shown in FIG. 1. The program(s) of the program product defines functions of the embodiments and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Some embodiments disclosed herein use to advantage DB2 UDB for iSeries available from IBM. However, embodiments are contemplated for any data management system. In addition, embodiments may support system functions as well as SQL. Accordingly, Table I provides interchangeable system and SQL terminology, which may be used herein.

TABLE 1

| SYSTEM: | SQL: |
|---|---|
| file | table |
| logical file | view |
| field | column |
| delete | drop |
| library | collection on schema |
| add | create |
| change | alter |
| record format | row |

In one embodiment, a state of a trigger is either operative or inoperative. In an operative state the trigger may be called during triggering I/O operations such as Insert, Update and Delete. The inoperative state indicates that the system has detected a condition that requires intervention by the user to analyze the trigger for potential data integrity problems. In a particular embodiment, a database management system (DBMS) will analyze the function being performed on a table (such as a rename of the table) and using the dependent object data, the DBMS will determine if the trigger is self-referencing. If so, the trigger is made inoperative. Making the trigger inoperative and requiring user intervention prevents the system from potentially producing undesired results and maintains the integrity of the database.

As used herein, an "object" refers to a means to conceptualize and organize a set of information or data with a set of interfaces to get or modify the information or data. Examples of objects include tables, views, libraries and programs. A library, in turn, is a collection of objects. "Qualified objects" or "sanitized objects" refers to objects with a name and the library (or collection) they reside in.

Qualification/sanitation refers to an expansion of a trigger definition to include critical information. For example, the user may specify a table and the DBMS will locate the library where the table resides, thereby qualifying the object.

In the present embodiments, a trigger definition contains dependent object and column information for an expanded CREATE TRIGGER statement. In this case, the trigger will reference different objects and is therefore dependent on those objects. A dependent object is defined as an object that has a dependency in some way on another object. By analogy, a child is dependent on its parent. Similarly, a view is built for a table and therefore is dependent on that table.

The foregoing concepts and definitions may be illustrated with reference to Statement I and Statement II. Statement I exemplifies SQL CREATE TABLE statements and Statement II exemplifies an SQL CREATE TRIGGER statement.

| STATEMENT I | |
|---|---|
| 001 | CREATE TABLE LIB1.TABLE1 |
| 002 | (COL1 INT NOT NULL WITH DEFAULT, |
| 003 | COL2 INT NOT NULL WITH DEFAULT, |
| 004 | COL3 INT NOT NULL WITH DEFAULT) |
| 005 | |
| 006 | CREATE TABLE LIB1.TABLE2 |
| 007 | (COL1 INT NOT NULL WITH DEFAULT, |
| 008 | COL2 INT NOT NULL WITH DEFAULT, |
| 009 | COL3 INT NOT NULL WITH DEFAULT) |
| 010 | |
| 011 | CREATE TABLE LIB2.TABLE3 |
| 012 | (COL1 INT NOT NULL WITH DEFAULT, |
| 013 | COL2 INT NOT NULL WITH DEFAULT, |
| 014 | COL3 INT NOT NULL WITH DEFAULT) |

| STATEMENT II | |
|---|---|
| 001 | CREATE TRIGGER LIB1.TRIG1 |
| 002 | AFTER UPDATE OF COL1, COL2, COL3 ON LIB1.TABLE1 |
| 003 | REFERENCING OLD AS X1 NEW AS X2 |
| 004 | FOR EACH ROW MODE DB2SQL |
| 005 | WHEN (X1.COL1 = 1) |
| 006 | BEGIN ATOMIC |
| 007 | INSERT INTO TABLE1 (COL1, COL2, COL3) VALUES (1,2,3); |
| 008 | INSERT INTO TABLE2 (COL1, COL2, COL3) VALUES (4,5,6); |
| 009 | INSERT INTO TABLE 3 (COL1, COL2, COL3) VALUES (7,8,9,); |
| 010 | END |

The SQL CREATE TABLE statements create three tables: TABLE1, TABLE2, AND TABLE3. Each of the tables have three columns named COLUMN1, COLUMN2 AND COLUMN3, wherein each column is of type integer. TABLE1 and TABLE2 are in collection (library) LIB and TABLE3 is in collection (library) LIB 2. The SQL CREATE TRIGGER statement is configured to create a trigger on TABLE1 in library LIB 1.

The portion of the CREATE TRIGGER statement between lines 006–010 is referred to as the trigger BODY. The portion of the CREATE TRIGGER statement on line 005 is referred to as the WHEN search condition. Together, the WHEN and BODY clause of the CREATE TRIGGER statement comprise a plurality of dependent objects. In this example, the dependent objects are tables and libraries. Note that each SQL INSERT references a table name but not the library name. During processing, the CREATE TRIGGER statement is sanitized to include the library name.

In one embodiment, the dependent object data is analyzed to determine if the trigger is self-referencing. The trigger is self-referencing when the ON TABLE is also referenced in the trigger routine's body. The ON TABLE refers to the table the trigger is being added to. Using the dependent data, it is determined at creation time (i.e., when the trigger is created or added to the table) whether or not a trigger is self-referencing. This determination is done by comparing the dependent tables referenced in the trigger body to the table the trigger is being added to.

In general, embodiments of the invention apply to any SQL or system function that modifies the name of an object or modifies the definition of an object. For brevity, discussion is limited to the system functions of move, rename, restore, change and alter, and open. Illustratively, whenever the trigger's table is renamed, or moved to a different schema, or the file is restored into a different schema, a self-referencing trigger will be made inoperative by the DBMS. Further, although reference is made below to embodiments employing SQL triggers, more generally embodiments include SQL and system triggers.

In one embodiment, the trigger definition has a flag which is set to the appropriate state. If an inoperative trigger exists for a table, the DBMS will prevent the table from being opened for the triggering operation and then send an escape message to the requester. The escape message indicates to the user that a potential integrity problem exists and requires investigation.

FIG. 1 shows an embodiment of a database management system (DBMS) 100 which is configured to parse inputs, such as the SQL Statement I and II, and store a resulting definition. The DBMS 100 is simplified for brevity, as many aspects of such systems are well known. In general, the DBMS 100 includes a plurality of interfaces 102A–C, a system database component 104, and a repository 106 for permanent objects (e.g., trigger definitions, table definitions, and user data stored in the tables). The interfaces 102A–C are each configured for different inputs. Specifically, an SQL interface 102A is configured to handle SQL statements, a system application programming interface (API) 102B is configured for program described requests and a system command interface 102C is configured for command line inputs. Illustratively, only three interfaces are shown. However, the DBMS 100 may include any number of interfaces. For brevity only the details of SQL interface 102A is provided and described below. Persons skilled in the art will readily understand the operation of the other interfaces 102B–C.

In general, each of the interfaces includes components necessary to handle and process input data. Thus, as exemplified by the SQL interface 102A, a data definition component 108 and a runtime component 110 are provided. The data definition component 108 includes a parser 112 and data definition language (DDL) 114. Similarly, the system database component 104 includes a definition component 104A and an execution component 104B. The definition component 104A provides the logic for formatting definition requests to be stored in the repository 106. The execution component 104B provides the program logic for retrieving data values from a table stored in the repository 106.

In operation, the parser 112 builds a parse tree from the SQL statement input interface 102A. The DDL 114 then builds an object definition from the parse tree. In tandem with the definition component 104A, the data definition component 108 renders an executable representation of the SQL statement. When executed via the runtime component 110 and the execution component 104B, the SQL statement causes an operation (i.e., update, insert or delete) to occur with respect to the data contained in repository 106, according to the statement type.

Figure 2:
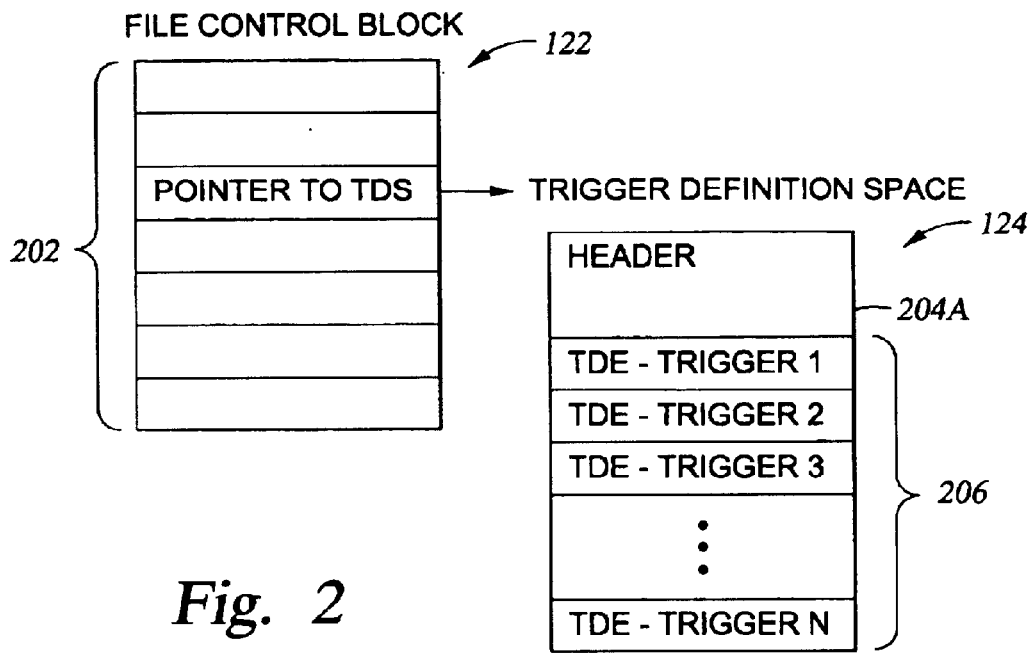
FIG. 2 is one embodiment of a data structure for a File Control Block and a Trigger Definition Space.

The repository 106 contains a plurality of tables 120 (i.e., table definitions and data), a File Control Block (FCB) 122, and a data dictionary 130. The tables 120 are stored in the form of data structures containing table definition information. The FCB 122 defines the characteristics of each table 120. If a table has one or more triggers, the FCB will point to a Trigger Definition Space (TDS) 124. The relationship between the FCB 122 and a TDS 124 is shown in FIG. 2.

Figure 3:
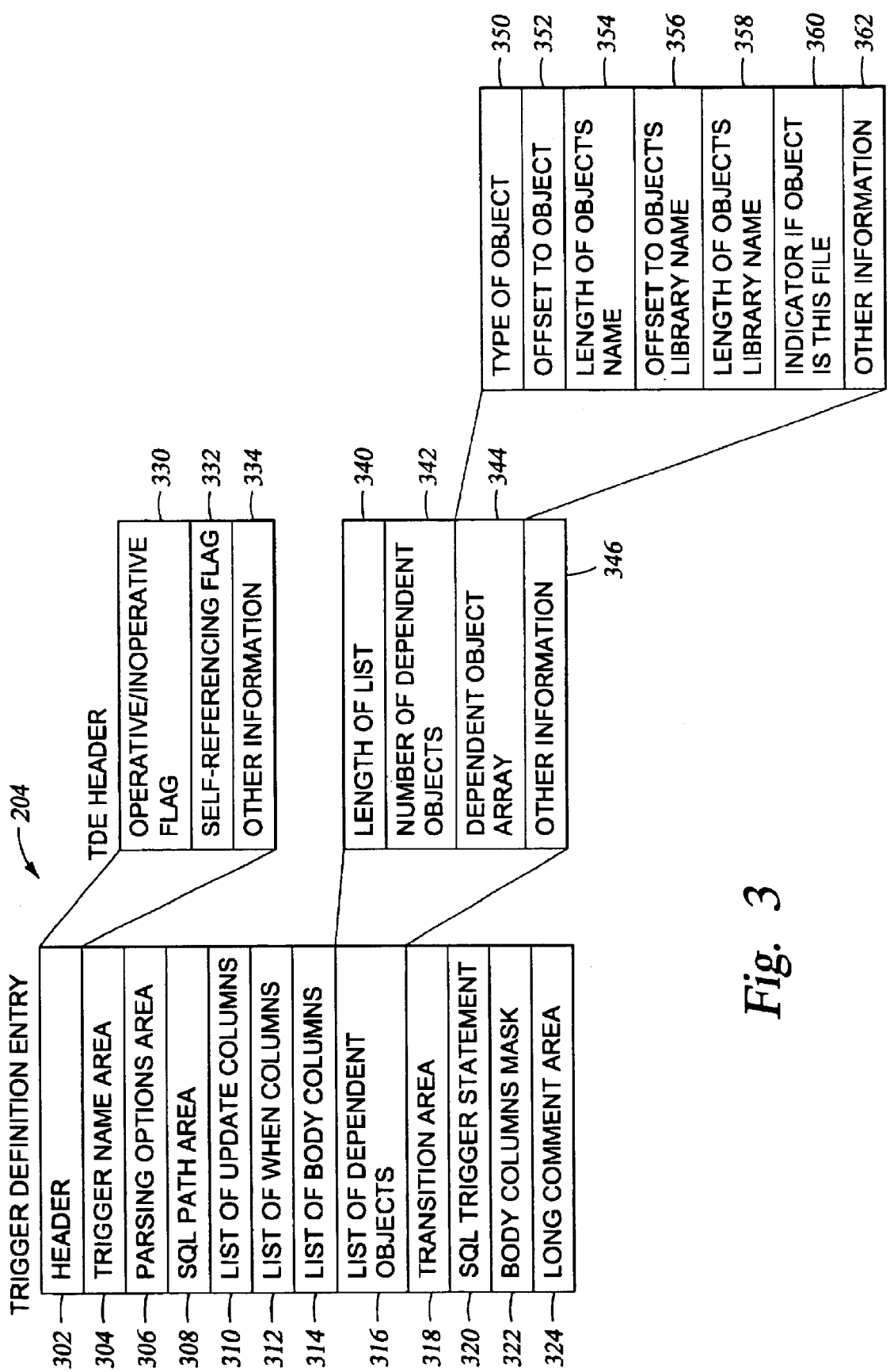
FIG. 3 is one embodiment of a trigger definition entry.

Illustratively, the FCB 122 is a data structure comprising a plurality of pointers 202. Each pointer 202 points to various portions of the FCB 122 and one of the pointers 202 points to a TDS 124. Each TDS 124 consists of a header 204A and one or more Trigger Definition Entries (TDE) 206. One TDE 206 exists for each trigger defined on the table characterized by the FCB 122. An embodiment of a TDE 204 is shown in FIG. 3.

Illustratively, each TDE 204 comprises a plurality of entries including a header 302, a trigger name area 304, a parsing options area 306, an SQL path area 308, an UPDATE columns list 310, a WHEN columns list 312, a BODY columns list 314, a dependent objects list 316, a transition area 318, an SQL trigger statement 320 (contains the sanitized version of the CREATE TRIGGER statement), a body columns masked 322 and a long comment area 324.

In one embodiment, the TDE header 302 comprises a trigger status flag 330, a self-referencing flag 332 and an entry 334 for other information. The trigger state flag 330 is configured to indicate an operative status and an inoperative status for the trigger. In one embodiment, the flag 330 may have a bit value of zero (0) or one (1), where zero (0) is a default value indicating the operative state and one (1) indicates the inoperative state. The self-referencing flag 332 may be similarly configured as a bit value and indicates whether the trigger is self-referencing. A self-referencing trigger is one where the table the trigger is created on is also referenced in the trigger BODY. The CREATE TRIGGER Statement II is an example of a self-referencing trigger because the table the trigger is created on, LIB1/TABLE1, is referenced in the trigger BODY by the syntax INSERT INTO LIB1/TABLE1.

In one embodiment, the dependent objects list 316 comprises a list length 340, a dependent objects number 342, a dependent object array 344 and an entry 346 for other information. In general, the dependent object array 344 contains information characterizing the object type and location. Illustratively, for each object, the array 344 comprises an object type 350, an object offset 352, an object name length 354, a library name offset 356, an object library name length 358, an object indicator 360 (indicates whether the object is the table for which the TDE 204 is defined) and an entry 362 for other information.

The object type 350 characterizes the nature of the object. For example, the object may be one of a table/physical file, a collection/schema/library, a view/logical file, an index, a user-defined function, a user-defined type, an alias, a procedure and the like.

The offset 352 and the name length 354 provide the location of the object and the offset 356 and the name length 358 provide the location of the object's library. All offsets are relative to the beginning of the CREATE TRIGGER statement.

Thus, in the embodiment shown, the dependent objects list 316 is not an actual list of objects, but rather a set of offsets into the sanitized CREATE TRIGGER statement 320 that can be used to determine the position of the dependent objects. As such, the term "list" contemplates any implementation including actual lists, offsets, etc. More generally, the dependent objects list 316 may be considered an "area" which may be configured in any manner to represent dependent objects. In addition, it should be noted that the dependent objects list 316 identifies all instances of an object in the same statement. Accordingly, there may be multiple entries for the same object name.

Figure 4:
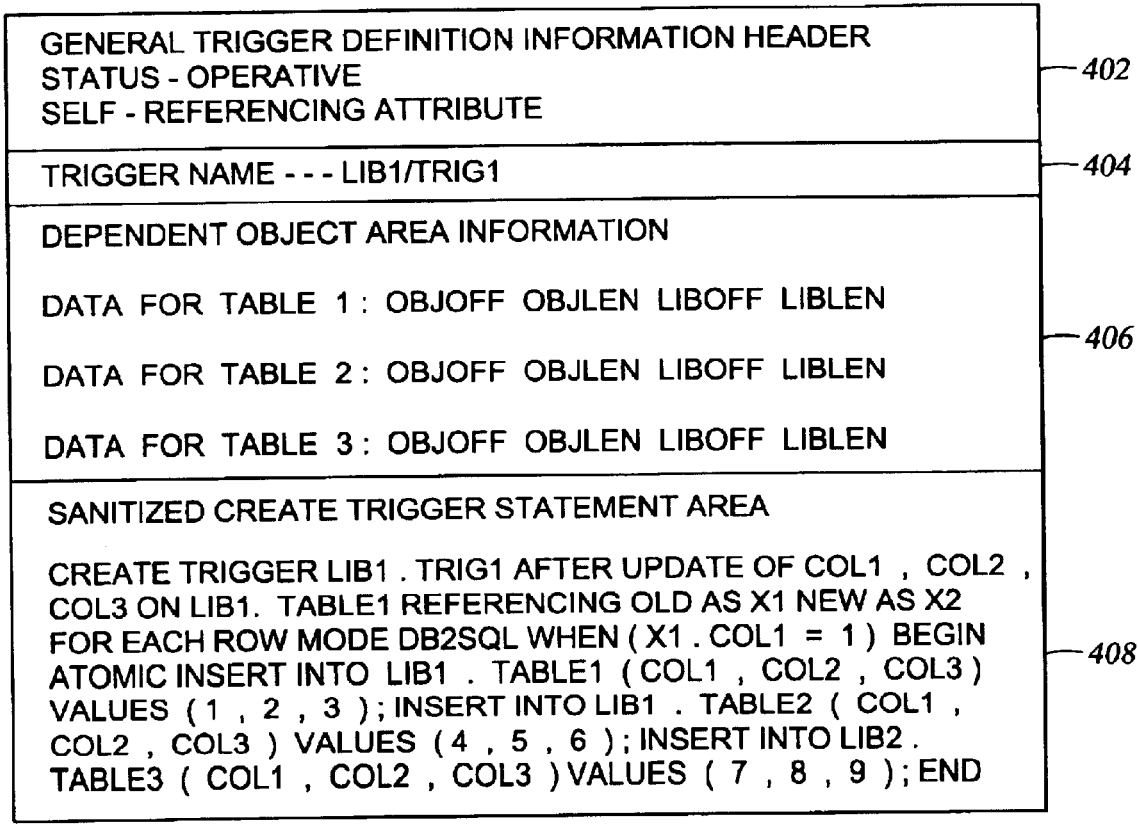
FIG. 4 is an illustrative trigger definition entry.

One embodiment of a TDE 400 for the CREATE TRIGGER Statement II is shown in FIG. 4. The TDE 400 is simplified to exclude some of the entries described with reference to the TDE 204 shown in FIG. 3. A header 402 indicates that the TDE 400 is self-referencing and has a status set to Operative. The trigger name 404 is LIB1/TRIG1. A dependent object information area 406 describes the location of dependent objects and their respective libraries. A trigger statement area 408 contains the sanitized version of the CREATE TRIGGER statement. As such, the sanitized statement includes reference to the libraries of TABLE1, TABLE2 and TABLE3.

Referring again to FIG. 1, the repository 106 is shown containing a data dictionary 130. The data dictionary comprises cross-reference files 132 and system catalogs 134. In turn, the cross-reference files 132 comprise a trigger names data structure 136 and a trigger dependents data structure 138. The data structures 136 and 138 will be populated using the information contained in the TDS 124. Specifically, the trigger name 304 from each TDE 204 is inserted into the trigger name data structure 136 and the dependent objects list 316 of each TDE 204 is inserted into the trigger dependents data structure 138.

The system catalogs 134 provide views of the data structure 136 and the trigger dependents data structure 138. In one embodiment, the system catalogs 134 comprises a SYSTRIGGER catalog 140 and a SYSTRIPDEP catalog 142. The SYSTRIGGER catalog 140 comprises one row for each trigger in the DB system. Each row contains a complete description of the trigger and the attributes of the trigger. The SYSTRIPDEP catalog 142 comprises multiple rows for each trigger definition as well as one row for each dependent object that a trigger BODY or WHEN references.

In various embodiments, storing a list of the dependant objects in the TDE 204 provides a number of advantages. In one embodiment, if the system cross-reference files 132 or SQL catalogs 134 become damaged or out of sync with the database system, the dependent object information can be rebuilt for the cross-reference files 132 and SQL catalogs 134 using the dependent object information contained in the TDE 204. For the iSeries, for example, this may be done using a Reclaim Storage (RCLSTG) CL command. To this end, the data for each trigger in a file may be extracted by the DBMS 100 and propagated to the system cross-reference files 132 and system catalogs 134. These files and catalogs can be queried by the user for easy access to the trigger dependency information. Given table T1 in LIB1, for example, a user can determine all the triggers that use that table and hence are dependent on it's existence. If the system terminates abnormally, the dependency data resides in persistent storage of the file so the system cross-reference files and system catalogs can be repopulated with the trigger dependent object data.

In another embodiment, an advantage is achieved because operations performed on the trigger's ON TABLE can be reflected in the actual CREATE TRIGGER statement. Operations include, for example, renaming a table, moving a table to another library, renaming a library and restoring a table to a different library. These operations will be described in more detail below.

Figure 5A:
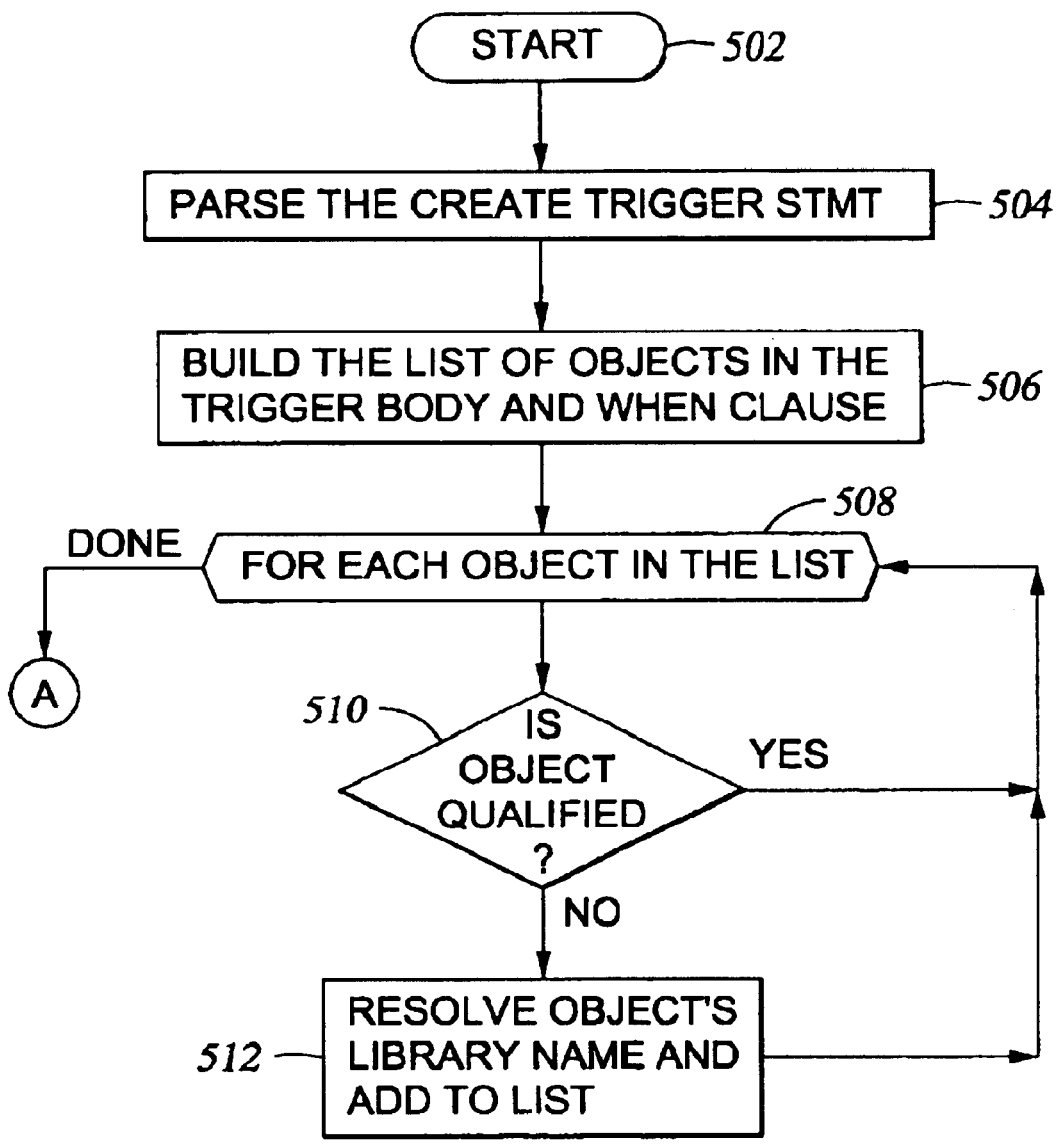
FIG. 5 is a flow chart illustrating a method of building a dependent object list.
Figure 5B:
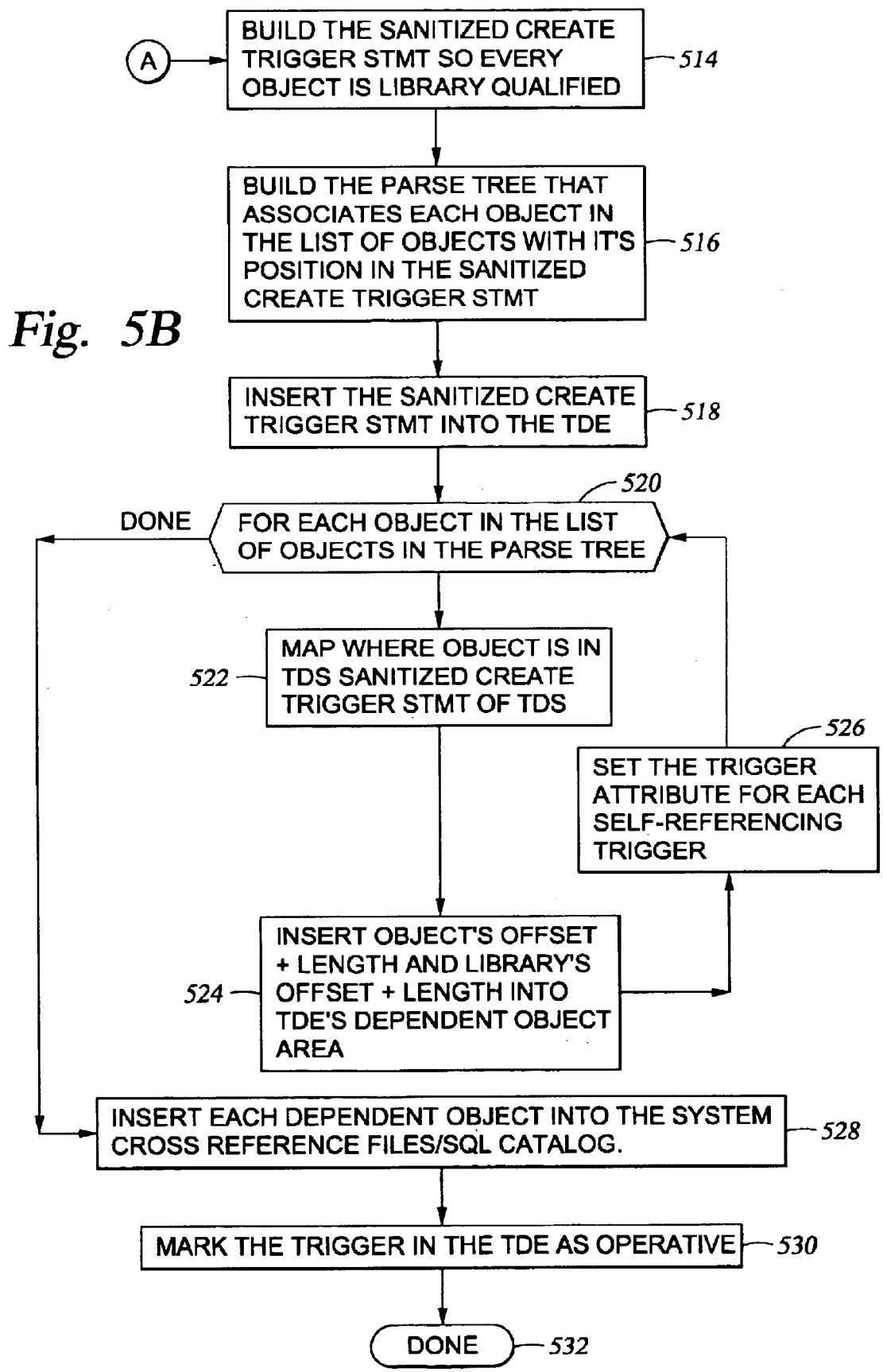

FIG. 5 describes one embodiment for a method 500 of building the dependent objects list 316 in the TDE 204 and propagating information to the system cross-reference files 132 and SQL catalogs 134. The method 500 is entered at step 502 and proceeds to step 504 where a CREATE TRIGGER statement is parsed. At step 506, a list of the objects contained in the trigger BODY and WHEN clause is built.

At step 508, a loop is entered for each object in the list. At step 510, the method 500 queries whether an object in the list is qualified. If not, the object's library name is resolved and then added to the list at step 512. The method 500 then returns to step 508 to begin processing the next object in the list. Steps 510 and 512 are repeated for each object in the list that is not qualified. Once all objects in the list are qualified (or step 510 is answered affirmatively), the method 500 proceeds to step 514 and builds a sanitized CREATE TRIGGER statement, whereby every object in the list is qualified.

At step 516, a parse tree is built associating each object in the list with its position in the sanitized CREATE TRIGGER statement. At step 518, the sanitized CREATE TRIGGER statement is inserted into a TDE.

At step 520, a loop is entered for each object in the parse tree. At step 522, the location of an object within the sanitized CREATE TRIGGER statement is mapped. At step 524, the object's offset and length, and the library's offset and length are inserted into the appropriate locations of the TDE (i.e., entries 352, 354, 356 and 358). The method 500 then returns to step 520 to repeat steps 522 and 524 for the next object in the parse tree. After the offsets for each object to have been stored to the TDE, the method 500 proceeds to step 526.

At step 526, a trigger attribute is set for each self-referencing trigger. Specifically, the self-referencing flag 332 of the TDE 204 is set to indicate whether the trigger is self-referencing or not. At step 528, each dependent object contained in the dependent object list 316 of the TDE 204 is inserted into the system cross-reference files 132 and the SQL catalogs 134. At step 530, the trigger is marked as being operative. Specifically, the trigger state flag 330 of the TDE 204 is set to a default value indicating that the trigger is operative. The method 500 then ends at step 532.

In the foregoing examples, a single trigger (TRIG1) is defined for TABLE1. However, it is understood that any number of triggers may be defined for TABLE1. Statement III is configured to define a second trigger (TRIG2) for TABLE1.

| | STATEMENT III |
|---|---|
| 001 | CREATE TRIGGER LIB1.TRIG 2 |
| 002 | AFTER UPDATE OF COL1, COL2, COL3 on LIB1.TABLE1 |
| 003 | REFRENCING OLD AS X1 NEW AS X2 |
| 004 | FOR EACH ROW MODE DB2SQL |
| 005 | WHEN (X1.COL1 = 1) |
| 006 | BEGIN ATOMIC |
| 007 | INSERT INTO TABLE1 (COL1, COL2, COL3) VALUES(1,2,3); |
| 008 | INSERT INTO TABLE3 (COL1, COL2, COL3,) VALUES(7,8,9); |
| 009 | END |

However, in this case the CREATE TRIGGER Statement III does not include the syntax INSERT INTO TABLE2. The object dependency for each trigger is illustrated by the relationship chart 600 shown in FIG. 6.

In some embodiments, methods are provided that allow a user to identify potential problems using objects that had been modified in some way by certain operations. Illustrative modifying operations include the SQL RENAME statement and the system functions to rename a file, renaming library, move a file and restore to a different library.

In one embodiment, if a table is renamed and the table has self referencing triggers defined on it, then the trigger will be set to inoperative. The inoperative status indicates to the user that there may be a potential of using an object in the trigger that does not exist or that may be the wrong object.

Consider, for example, the SQL RENAME Statement IV which is configured to rename TABLE1 to TABLE1X. FIG. 7 shows the resulting TDE 700.

| | STATEMENT IV |
|---|---|
| 001 | RENAME TABLE LIB1.TABLE1 TO SYSTEM NAME TABLE1X |

The rename Statement IV impacts the trigger (TRIG1) in two ways. First, the ON TABLE of sanitized CREATE TRIGGER statement 702 has been changed from TABLE1 to TABLE1X in accordance with the rename operation. Second, the trigger state flag has been changed from operative to inoperative. This is done because there is a reference in the trigger BODY to TABLE1 (i.e., because the trigger is self-referencing, as indicated by the syntax INSERT INTO LIB1. TABLE1 . . . ).

Without further information, the intention of the user is unclear after the rename operation. If the user planned to create a new TABLE1, the reference to TABLE1 may have been intentional. Alternatively, the user may have intended the syntax INSERT INTO LIB1. TABLE1 to now refer to TABLE1X. Accordingly, by setting the trigger status to inoperative potential problems may be obviated.

In one embodiment, if an inoperative trigger exists for a table, the DBMS 100 may prevent the table from being opened for the triggering operation and then send an escape message to the requester. The escape message indicates to the user that a potential integrity problem exists that requires investigation. Before the file can be opened, the user may determine if the trigger should be modified. This may be done by displaying the trigger definition, printing the trigger definition or inserting the trigger definition into an outfile. The user can then see how the trigger references the ON TABLE in the trigger body.

In one embodiment, a user can determine the dependent objects used by an operative trigger by querying the system trigger dependency catalog SYSTRIGDEP using a SELECT statement. Statement V is an example of a SELECT statement for the above trigger, TRIG1.

| | STATEMENT V |
|---|---|
| 001 | SELECT * FROM QSYS2.SYSTRIGDEP WHERE TRIGGER_SCHEMA = |
| 002 | 'LIB1' AND TRIGNAME = 'TRIG1' |

The results of Statement V are shown in Table II.

TABLE II

| TRIGGER_SCHEMA | TRIGGER_NAME | OBJECT_SCHEMA | OBJECT_NAME | OBJECT_TYPE |
|---|---|---|---|---|
| LIB1 | TRIG1 | LIB1 | TABLE1 | TABLE |
| LIB1 | TRIG1 | LIB1 | TABLE2 | TABLE |
| LIB1 | TRIG1 | LIB2 | TABLE3 | TABLE |

The TRIGGER_SCHEMA column and the TRIGGER_NAME column indicate the SQL collection the trigger resides in and the name of the trigger of interest, respectively. The OBJECT_SCHEMA column, OBJECT_NAME column, and OBJECT_TYPE column collectively describe the dependent objects for TRIG1.

With the information provided in Table II, a user can then query the SYSTRIGGER catalog 140 to view the BODY of the CREATE TRIGGER statement. Using the information therein, the user can determine whether the trigger is correct as is or should be modified.

If the trigger is to be modified, the trigger definition can be inserted into a source file and changed/modified. If the trigger definition is correct as is, or after modifying the trigger definition, the user should indicate through the DBMS 100 that the trigger should be put in the operative state. One way to change the state of the trigger to operative, is to extract the trigger definition (i.e., get a copy of the trigger definition), remove the trigger (i.e., destroy the trigger for the table using a DROP TRIGGER statement), and then recreate the trigger (with a CREATE TRIGGER statement) using the extracted or modified definition. In another embodiment, a command or GUI interface could be used to change the state of the trigger.

Figure 8:
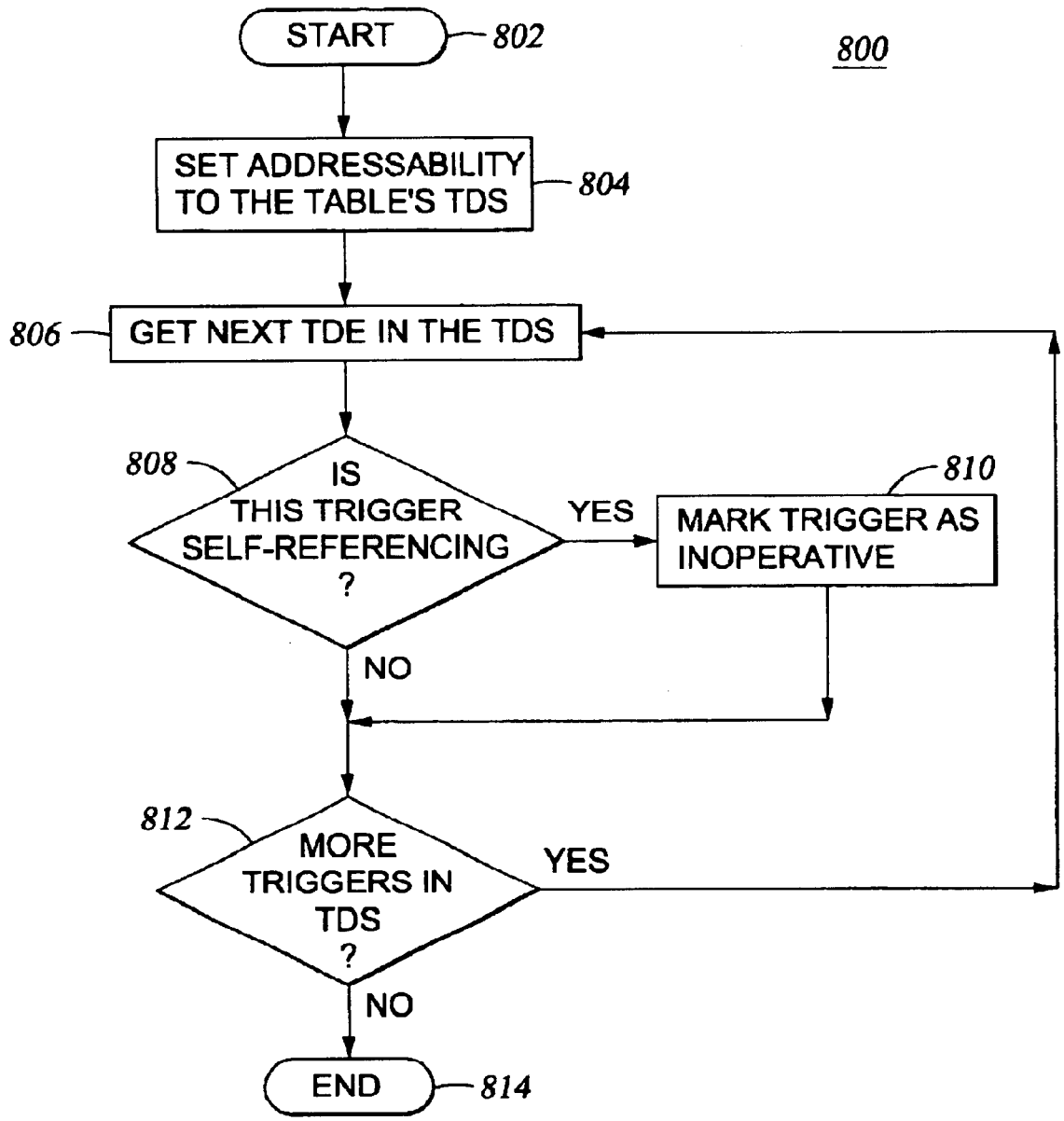
FIG. 8 is a flow chart illustrating a method of determining a trigger's inoperative/operative status due to a modification of a table on which the trigger is defined.

FIG. 8 shows a method 800 for determining whether a trigger status should be set to inoperative. Method 800 is entered at step 802 due to an operation such as a table being renamed, the table's library being renamed or the table being moved/restored to a different library. At step 804, the addressability of the table's TDS is set (that is, the beginning of the TDS is located).

The method 800 then enters a loop comprising a series of steps repeated for each TDE in the TDS. At step 806, the first TDE is retrieved for processing. At step 808, the method 800 queries whether the trigger is self-referencing. That is, a determination is made to as to whether the table is used in the BODY or WHEN clause of the TDE. If step 508 is answered affirmatively, the method 800 proceeds to step 810 where the trigger is marked as inoperative. The method 800 then proceeds to step 812 to query whether the TDS for the current table contains additional triggers. Method 800 also proceeds to step 812 if the query at step 808 is answered negatively. If no additional triggers are defined for the table, the method 800 exits at step 814. If additional triggers are defined, the method 800 returns to step 806 to retrieve the next TDE in the TDS. In this manner, steps 808, 810 and 812 are repeated for each trigger defined on the table.

Method 800 is implemented with particular regard for tables. However, more generally, embodiments are provided in which a trigger status is changed from operative to inoperative if any object in the associated dependent object list 316 is renamed or moved to a different library, or if the object's library is renamed or restored to the different library. In such cases, user intervention may determine whether the trigger is correct or requires modification.

Figure 9:
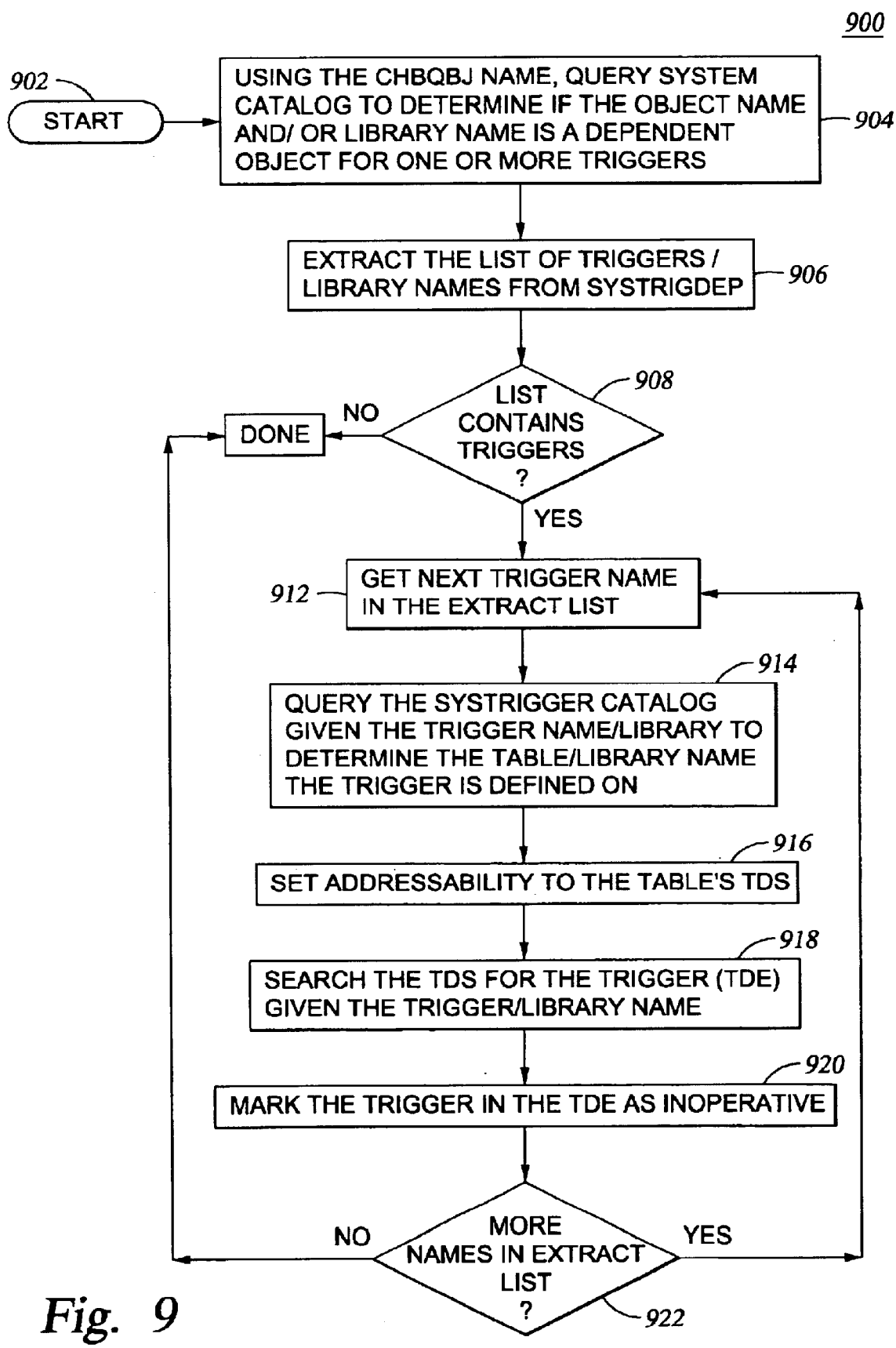
FIG. 9 is a flow chart illustrating a method of determining a trigger's inoperative/operative status due to a modification to a dependent object.

FIG. 9 shows a method 900 for determining whether a trigger status should be set to inoperative due to a dependent object name or library name being changed by an operation such as a rename or move operation. The object/library being changed will be referred to as the changed object (abbreviated CHGOBJ).

The method 900 is entered at step 902 and proceeds to step 904 where the SYSTRIGDEP catalog 142 of the system catalogs 134 is queried to determine if the object name and/or library name of the CHGOBJ is a dependent object for one or more triggers. At step 906, the list of triggers/library names are extracted from the SYSTRIGDEP catalog. At step 908, the method 900 queries whether the extract list contains any triggers. If not, the method 900 exits at step 910. If the list does contain triggers, the first trigger name is retrieved for processing at step 912.

Given the trigger name/library, the SYSTRIGGER catalog 140 of the system catalogs 134 is queried (at step 914) to determine the table/library name on which the trigger is defined. At step 916, the addressability of the associated table's TDS is set. At step 918, the TDS is searched for the TDE of the trigger name being processed. At step 920, the trigger is marked as inoperative. At step 922, the method 900 queries whether the extract list contains more trigger names. If not, the method 900 exits at step 910. Otherwise, the method 900 returns to step 912 to begin processing the next trigger name in the extract list. In this manner, each trigger referenced in the extract list is set to inoperative.

Note that methods 800 and 900 provide the same result for a self-referencing trigger defined on a table being modified (moved, renamed, etc.). That is, the trigger will be set to inoperative. With regard to method 900, step 914 will return the table being modified for a self-referencing trigger. The TDE for the trigger will then be located in the table's TDS (step 916) and marked inoperative (920). However, method 900 is configured for objects other than tables and thus provides broader application.

In some embodiments, the DBMS 100 is responsible for system enhancements. "System enhancements" refers to any function or intervention by the DBMS 100 for the purpose of modifying or not modifying data such that the user is not impacted later by having to do this manually or not knowing a situation even exists. The DBMS 100 intervenes for a number of cases so as to help the user manage the triggers with dependent objects.

In one embodiment, the DBMS 100 is configured with methods for the user to either restrict the removal of, or remove, the objects an entity is dependent on according to a command type. As used herein, "entity" refers to anything dependent upon an object. Illustrative entities include views, constraints, triggers and the like. For simplicity, portions of the following discussion are limited to triggers. However, it is understood that the methods apply to other entities having a dependency relationship with objects.

Illustratively, system enhancements apply to the SQL ALTER TABLE, DROP TABLE, DROP COLLECTION as well as the system functions of delete library (DLTLIB), delete file (DLTFI). For SQL statements, the syntax allows an attribute (command type) of CASCADE, RESTRICT or "nothing specified". In one embodiment, the "nothing specified" defaults to CASCADE and will be referred to as "default CASCADE".

For DROP TABLE, DROP COLLECTION, or ALTER TABLE, the DBMS 100 queries the system catalogs 134 for entities dependent on the object(s) being dropped or, for the alter case, the columns being modified. In each case, the DBMS is configured to drop or not drop the object and drop or not drop the dependent entities of the object. Illustratively, the object is a table, a collection or a column. However, as was noted above, the objects may be any number of database items.

For DROP TABLE of RESTRICT, if a dependency is found, then the table will not be dropped. For DROP TABLE of CASCADE, if dependencies are found, then those triggers with the dependency on the table being dropped will also be dropped. For DROP TABLE of default CASCADE, then the table will be dropped; but any triggers dependent on the table being dropped will be kept.

For DROP COLLECTION of RESTRICT, if the collection contains triggers, the DROP will fail. A DROP COLLECTION of CASCADE behaves the same way as DROP TABLE CASCADE. DROP COLLECTION default CASCADE behaves the same way as DROP TABLE default CASCADE.

For ALTER TABLE of RESTRICT, if a column is being dropped and if the query shows there are other triggers dependent on this column, then the ALTER TABLE will fail. This is true whether the trigger is the ALTER TABLE file (self-referencing) or another file. For ALTER TABLE of CASCADE, if a column is being dropped and the query shows there are other triggers dependent on this column, then the ALTER TABLE will drop all the triggers dependent of the column. For ALTER TABLE of default CASCADE, if a column is being dropped, the behavior is the same as ALTER TABLE CASCADE. For ALTER TABLE modify COLUMN attributes, if one or more columns are listed by the query as being dependent columns, then those triggers (whether the ALTER TABLE file or other files) will have the trigger programs regenerated to ensure the new attributes match with the data as specified in the trigger's BODY.

The System DLTFI function behaves like DROP TABLE default CASCADE. Thus, the file will be dropped. If the file has any triggers dependent on it, the triggers will be kept. The System DLTLIB function will behave the same way as a DROP COLLECTION default CASCADE. Thus, any files will be deleted. If the file has any triggers dependent on it, the triggers will be kept.

The foregoing system enhancements are summarized in Table 2. Note that "COLLECTION" has been abbreviated "COLL." AND "default CASCADE" has been abbreviated "DCASCADE"

TABLE 2

SQL STATEMENTS:

| | |
|---|---|
| DROP TABLE of RESTRICT: | Fail if dependency found. |
| DROP TABLE of CASCADE: | Drop table and dependent triggers. |
| DROP TABLE of DCASCADE: | Drop table and keep dependent triggers. |
| DROP COLL. of RESTRICT: | Fail if collection contains triggers. |
| DROP COLL. of CASCADE: | Same as DROP TABLE CASCADE. |
| DROP COLL. of DCASCADE: | Same as DROP TABLE DCASCADE. |
| ALTER TABLE of RESTRICT: | Fail if other triggers are dependent on column. |
| ALTER TABLE of CASCADE: | Drop all triggers dependent on column. |
| ALTER TABLE of DCASCADE: | Same as ALTER TABLE of CASCADE. |

TABLE 2-continued

| | |
|---|---|
| ALTER TABLE__modify COLUMN attributes: | If at least one dependent column exists, regenerate trigger programs to ensure new attributes match data trigger BODY data. |
| SYSTEM FUNCTIONS: | |
| DLTFI: | Drop file, keep dependent triggers. |
| DLTLIB: | Delete file, keep dependent triggers. |

Figure 10:
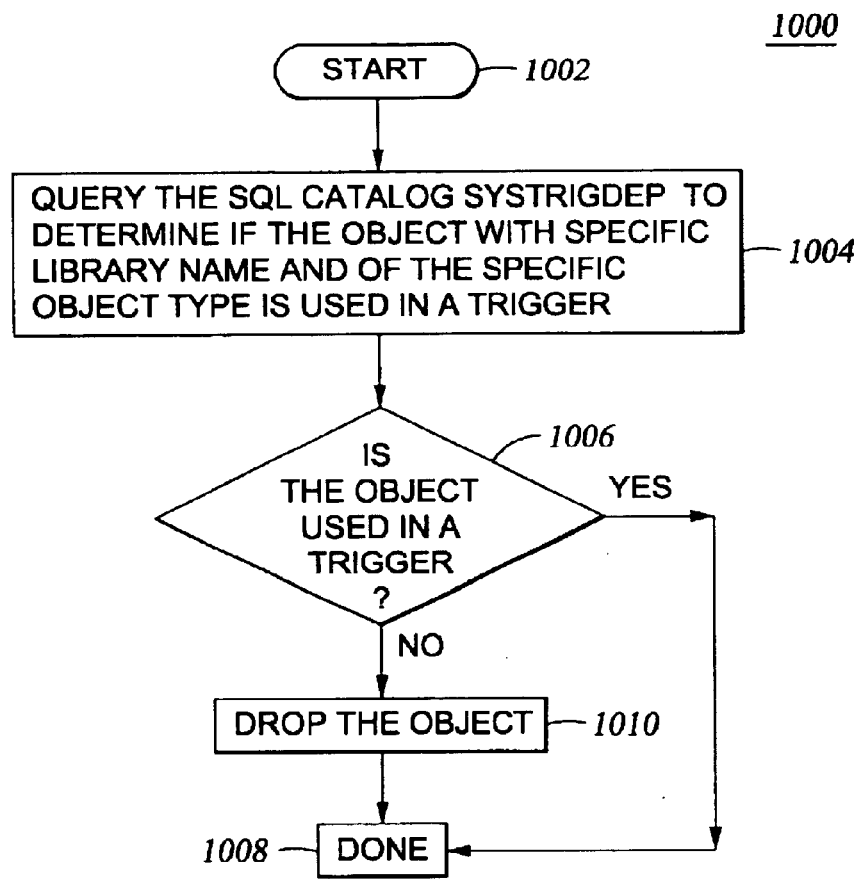
FIG. 10 is a flow chart illustrating a method of determining whether an object can be dropped.
Figure 11:
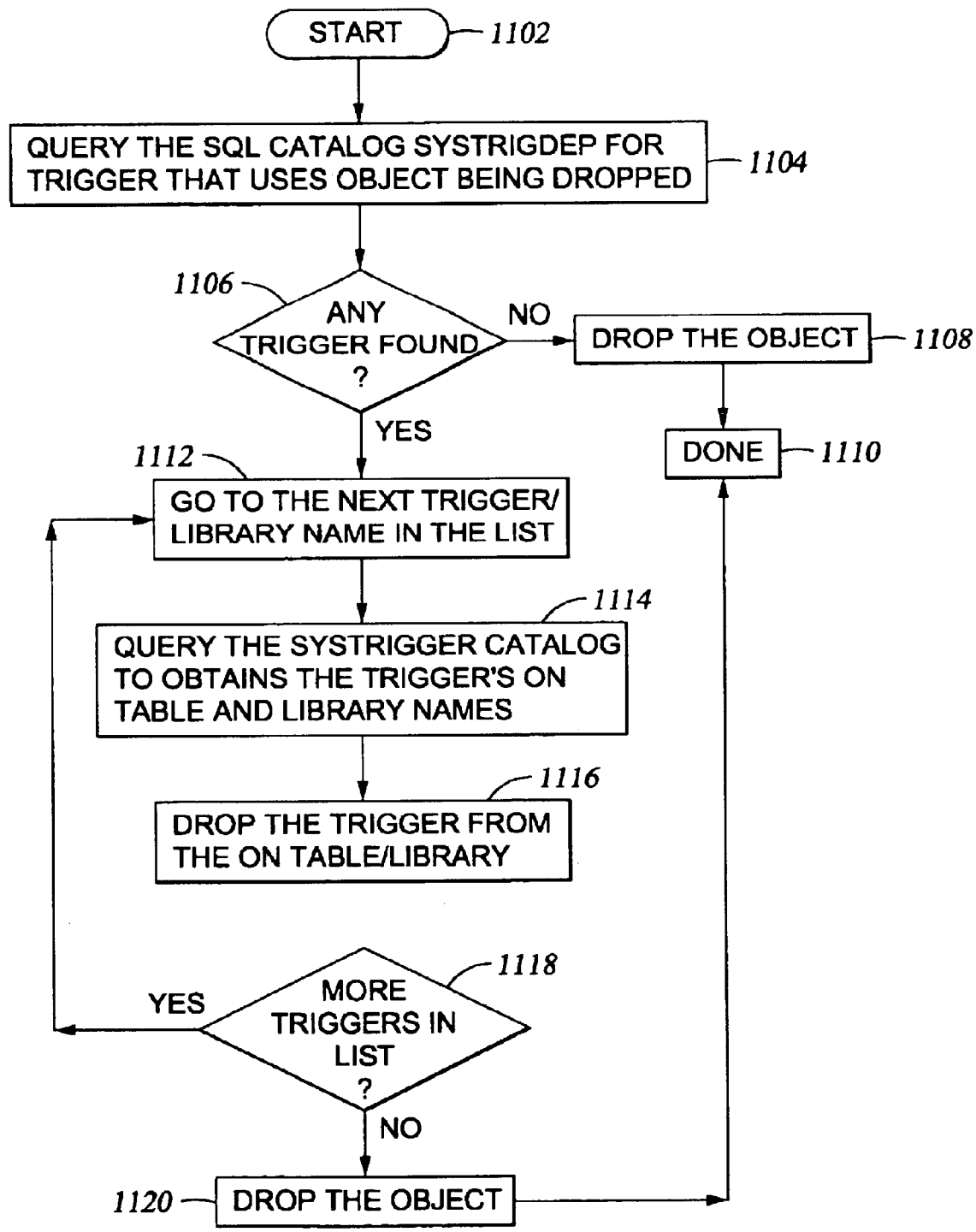
FIG. 11 is a flow chart illustrating a method for dropping an object and its dependents.

Accordingly, in the case of RESTRICT, an object is not dropped if it has associated dependent entities. In the case of CASCADE, an object and its dependents (if any exist) are dropped. FIGS. 10 and 11 illustrate processing for RESTRICT and CASCADE, respectively.

FIG. 10 shows a method 1000 for processing the DROP xxxx RESTRICT syntax. Method 1000 applies for any object type in a dependent object list 316. Method 1000 is entered at step 1002 for any RESTRICT operation. Method 1000 then proceeds to step 1004 where the catalog 142 is queried for triggers referencing the object to be dropped, wherein the object is defined by an object name, a specific library name and a specific object type. That is, a determination is made as to whether any triggers depend on the object. Such triggers include any TDEs having a dependent object list 316 containing the object. At step 1006, the method 1000 queries whether a trigger containing the dependent object is found. If so, the object is used in a trigger and is not dropped and the method 1000 exits at step 1008. If, on the other hand, the object is not used in a trigger, the object is dropped at step 1010 and the method 1000 exits at step 1008.

FIG. 11 shows a method 1100 for processing the DROP xxxx CASCADE syntax. Method 1100 is entered at step 1102 for any CASCADE I/O operation. Method 1100 then proceeds to step 1104 where the catalog 142 is queried for any triggers referencing the object being dropped. If such triggers are found, the results returned from the query include a list of trigger/library names. At step 1106, the method 1100 queries whether any triggers referencing the object being dropped are found. If not, the object is dropped at step 1108 and the method 1100 is exited at step 1110.

If a trigger referencing the object is found, a loop is entered for each trigger/library name contained in the list returned at step 1104. At step 1112, the first trigger/library name is retrieved from the list for processing. At step 1114, the catalog 140 is queried to obtain the trigger's ON TABLE and library names. At step 1116, the trigger is dropped from the ON TABLE/library. At step 1118, the method 1100 queries whether more triggers are contained in the list returned from step 1104. If so, the method 1100 returns to step 1112 to retrieve the next trigger/library name for processing. Once all the triggers in the list have been processed, the object is dropped at step 1120. The method 1100 then exits at step 1110.

Embodiments of RESTRICT and CASCADE may be illustrated with reference to the tables created by Statement I and the trigger (TRIG1) created by Statement II. In the case of RESTRICT, consider Statement VI. In this case, the table TABLE2 will not be dropped because the trigger TRIG1 has a dependency on this object.

| STATEMENT VI | |
|---|---|
| 001 | DROP TABLE LIB1.TABLE2 RESTRICT |

In the case of CASCADE, consider Statement VII. In this case, TABLE2 will be dropped. In addition, because trigger TRIG1 has dependency on this object, TRIG1 will also be dropped.

| STATEMENT VII | |
|---|---|
| 001 | DROP TABLE LIB1.TABLE2 CASCADE |

Figure 6:
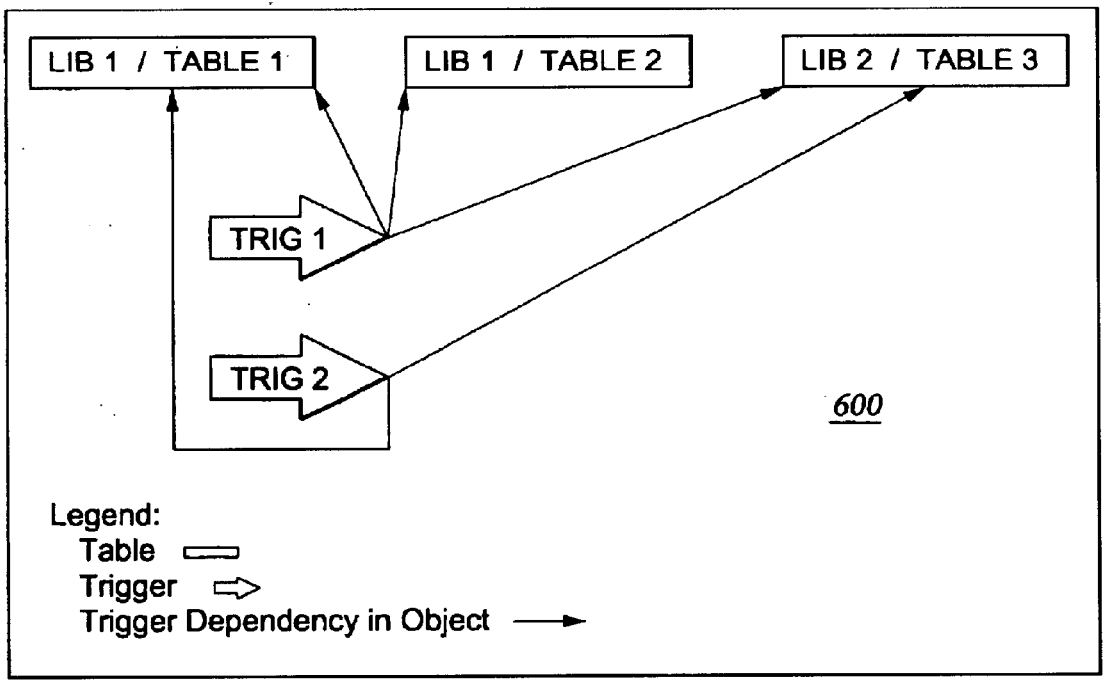
FIG. 6 is a relationship chart for triggers and tables.
Figure 12:
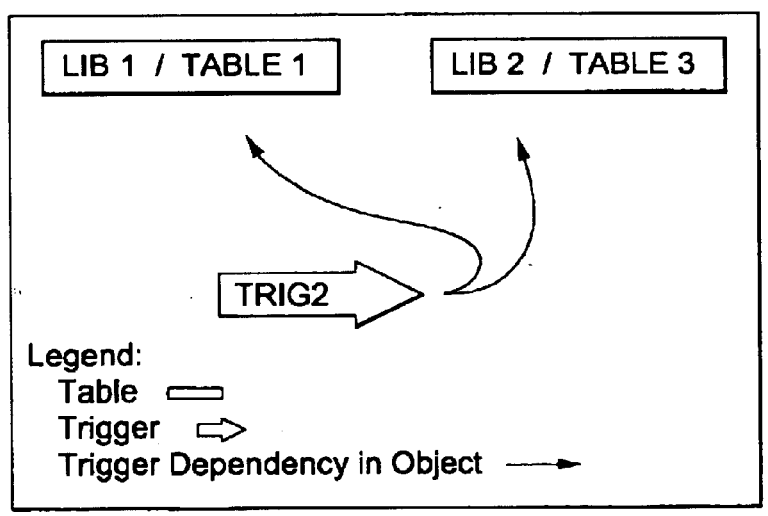
FIG. 12 is a relationship chart for triggers and tables after a DROP.

FIG. 6, described above, shows the dependency relationship of TABLE1, TABLE2 and TABLE3 and TRIG1 and TRIG2. The dependency relationship following the DROP of Statement VII is shown in FIG. 12. As illustrated, TABLE2 and TRIG1 have been removed. In this manner, a DROP xxxxx CASCADE helps to ensure there are no triggers dependent on non-existent tables, libraries and columns.

Thus, the foregoing system enhancements further ensure the integrity of the database. In addition, flexibility is provided in allowing the user to recover from bad or damaged data. For example, if a file is damaged, the user can DROP the affected TABLE but keep all dependent triggers. Even though these triggers are orphaned at this time, a copy of the file can be restored from media. In this manner, the database environment is returned to the original state without changing the dependent triggers.

While the foregoing is directed to the preferred embodiment of the present invention, other and further embodiments of the invention may be devised without departing from the basic scope thereof, and the scope thereof is determined by the claims that follow.

What is claimed is:

1. A method of maintaining integrity in a database comprising a plurality of triggers defined on at least one of a plurality of objects, comprising:
   (a) receiving an I/O event affecting an object;
   (b) determining whether a trigger defined on the object is self-referencing; and
   (c) if the trigger is self-referencing, making the trigger inoperative.

2. The method of claim 1, wherein (b) and (c) are repeated for each of a plurality of triggers defined on the object.

3. The method of claim 1, wherein the I/O operation is one of a rename operation, a move operation, a restore operation and any combination thereof.

4. The method of claim 1, wherein (b) comprises examining a value in a trigger definition entry associated with the object.

5. The method of claim 1, wherein (c) comprises changing a value in a trigger definition entry associated with the object.

6. The method of claim 1, wherein (b) comprises examining a first value in a trigger definition entry associated with the object and wherein (c) comprises changing a second value in the trigger definition entry.

7. A method of maintaining integrity in a database comprising a plurality of triggers defined on at least one of a plurality of tables, comprising:
   (a) receiving an I/O event affecting an object;
   (b) determining whether the object has a dependency relationship with at least one trigger of the plurality of triggers;
   (c) if the object has a dependency relationship with at least one trigger, determining a table on which the at least one trigger is defined, wherein the table has trigger definition space;
   (d) locating a trigger definition entry of the at least one trigger within the trigger definition space; and
   (e) making the at least one trigger inoperative.

8. The method of claim 7, wherein (b) through (e) are repeated for each of the plurality of triggers having a dependency relationship with the object.

9. The method of claim 7, wherein receiving an I/O event comprises receiving one of a rename operation, a move operation and a restore operation.

10. The method of claim 7, wherein determining whether the object has a dependency relationship comprises querying a system catalog with at least one of a name for the object and a library for the object.

11. The method of claim 7, wherein determining whether the object has a dependency relationship comprises querying a system catalog with at least one of a name for the object and a library for the object and wherein the system catalog is populated with object dependency information contained in the trigger definition entry.

12. The method of claim 7, wherein determining the table on which the at least one trigger is defined comprises querying a system catalog with a trigger name and a trigger name and trigger library.

13. The method of claim 7, wherein making the at least one trigger inoperative comprises changing a value in the trigger definition entry.

14. A signal bearing medium containing a program which, when executed by at least one processor, performs a method of maintaining integrity in a database comprising a plurality of triggers defined on at least one of a plurality of tables, the method comprising:
   (a) receiving an I/O event affecting an object;
   (b) determining whether a trigger defined on the object is self-referencing; and
   (c) if the trigger is self-referencing, making the trigger inoperative.

15. The signal bearing medium of claim 14, wherein (b) and (c) are repeated for each of a plurality of triggers defined on the object.

16. The signal bearing medium of claim 14, wherein the I/O operation is one of a rename operation, a move operation, a restore operation and any combination thereof.

17. The signal bearing medium of claim 14, wherein (b) comprises examining a value in a trigger definition entry associated with the object.

18. The signal bearing medium of claim 14, wherein (c) comprises changing a value in a trigger definition entry associated with the object.

19. The signal bearing medium of claim 14, wherein (b) comprises examining a first value in a trigger definition entry associated with the object and wherein (c) comprises changing a second value in the trigger definition entry.

20. A signal bearing medium containing a program which, when executed by at least one processor, performs a method of maintaining integrity in a database comprising a plurality of triggers defined on at least one of a plurality of tables, the method comprising:
   (a) receiving an I/O event affecting an object;
   (b) determining whether the object has a dependency relationship with at least one trigger of the plurality of triggers;

(c) if the object has a dependency relationship with at least one trigger, determining a table on which the at least one trigger is defined;

(d) locating a trigger definition entry of the at least one trigger; and (e) making the at least one trigger inoperative.

21. The signal bearing medium of claim 20 wherein (b) through (e) are repeated for each of the plurality of triggers having a dependency relationship with the object.

22. The signal bearing medium of claim 20, wherein receiving an I/O event comprises receiving one of a rename operation, a move operation and a restore operation.

23. The signal bearing medium of claim 20, wherein determining whether the object has a dependency relationship comprises querying a system catalog with at least one of a name for the object and a library for the object.

24. The signal bearing medium of claim 20, wherein determining whether the object has a dependency relationship comprises querying a system catalog with at least one of a name for the object and a library for the object and wherein the system catalog is populated with object dependency information contained in the trigger definition entry.

25. The signal bearing medium of claim 20, wherein determining the table on which the at least one trigger is defined comprises querying a system catalog with a trigger name and a trigger library.

26. The signal bearing medium of claim 20, wherein determining the table on which the at least one trigger is defined comprises querying a first system catalog with a trigger name and a trigger library for the at least one trigger and wherein determining whether the object has a dependency relationship comprises querying a second system catalog with at least one of an object name and an object library for the object.

27. The signal bearing medium of claim 20, wherein making the at least one trigger inoperative comprises changing a value in the trigger definition entry.

28. The signal bearing medium of claim 27, further comprising if the least one dependent entity is dependent on the database object and if the database command is a second command type, affecting the database object according to the database command and dropping the at least one dependent entity.

29. The signal bearing medium of claim 28, wherein the second command type is a CASCADE command.

30. A data structure, comprising trigger definition information for a trigger defined on a table, wherein the trigger definition information comprises:

a status value indicative of whether the trigger definition is operative or inoperative;

a type value indicative of whether the trigger definition is self-referencing;

at least one dependent object having a dependency relationship with the trigger definition;

a CREATE TRIGGER statement containing the at least one dependent object; and a dependent object area specifying a location of the at least one dependent object according to a dependent object name offset from a beginning of the CREATE TRIGGER statement, a dependent object name length, a dependent object library offset from the beginning of the CREATE TRIGGER statement and a dependent object library length.

31. A method of maintaining integrity in a database comprising a plurality of triggers defined on at least one of a plurality of tables, comprising:

(a) receiving an I/O event affecting an object;

(b) determining whether the object has a dependency relationship with at least one trigger of the plurality of triggers;

(c) if the object has a dependency relationship with at least one trigger, determining a table on which the at least one trigger is defined, wherein the table has trigger definition space;

(d) locating a trigger definition entry of the at least one trigger within the trigger definition space; and (e) making the at least one trigger inoperative; wherein determining the table on which at least one trigger is defined comprises querying a first system catalog with a trigger name and a trigger library for the at least one trigger and wherein determining whether the object has a dependency relationship comprises querying a second system catalog with at least one of an object name and an object library for the object.

* * * * *